(12) United States Patent
Tooker et al.

(10) Patent No.: US 11,247,546 B2
(45) Date of Patent: Feb. 15, 2022

(54) VEHICLE REAR SLIDER WINDOW ASSEMBLY WITH UPPER RAIL CO-EXTRUDED FILLER

(71) Applicant: Magna Mirrors of America, Inc., Holland, MI (US)

(72) Inventors: Troy F. Tooker, Holland, MI (US); David L. Guillozet, Hamilton, MI (US); Andrew D. Rohrer, Zeeland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 157 days.

(21) Appl. No.: 16/565,543

(22) Filed: Sep. 10, 2019

(65) Prior Publication Data

US 2020/0079198 A1     Mar. 12, 2020

Related U.S. Application Data

(60) Provisional application No. 62/729,706, filed on Sep. 11, 2018.

(51) Int. Cl.
| | |
|---|---|
| E06B 1/00 | (2006.01) |
| B60J 10/76 | (2016.01) |
| B60J 1/18 | (2006.01) |
| B60J 10/16 | (2016.01) |
| B60J 10/27 | (2016.01) |
| B60J 10/35 | (2016.01) |
| B60J 10/00 | (2016.01) |
| B29C 48/21 | (2019.01) |
| B29C 48/12 | (2019.01) |
| B29L 31/30 | (2006.01) |
| B29K 23/00 | (2006.01) |

(Continued)

(52) U.S. Cl.
CPC ............... *B60J 10/76* (2016.02); *B29C 48/12* (2019.02); *B29C 48/21* (2019.02); *B60J 1/1846* (2013.01); *B60J 10/16* (2016.02); *B60J 10/27* (2016.02); *B60J 10/35* (2016.02); *B60J 10/45* (2016.02); *B29K 2023/16* (2013.01); *B29K 2027/06* (2013.01); *B29K 2055/02* (2013.01); *B29K 2077/00* (2013.01); *B29K 2509/08* (2013.01); *B29L 2031/3005* (2013.01)

(58) Field of Classification Search
CPC ... B60J 10/76; B60J 10/16; B60J 10/17; B60J 10/27; B60J 1/1846; B60J 1/1853
USPC .................................................. 49/413, 380
See application file for complete search history.

(56) References Cited

U.S. PATENT DOCUMENTS

| | | |
|---|---|---|
| 4,920,698 A | 5/1990 | Friese et al. |
| 4,995,195 A | 2/1991 | Olberding et al. |

(Continued)

*Primary Examiner* — Jerry E Redman
(74) *Attorney, Agent, or Firm* — Honigman LLP

(57) ABSTRACT

A slider window assembly for a vehicle includes at least one fixed window panel and a movable window panel that is movable along an upper rail and a lower rail at the at least one fixed window panel between a closed position and an opened position. The upper rail includes a channel, and a filler is disposed in the channel of the upper rail. The filler includes a filler body having opposite side walls, and the filler includes lips established along respective ones of the side walls. The lips are extruded onto and along the filler body. The lips include a compressible and flexible material and provide a dampening and cushioning function at the movable window panel when the movable window panel is disposed in the channel of the upper rail.

12 Claims, 4 Drawing Sheets

(51) Int. Cl.
*B29K 55/02* (2006.01)
*B29K 27/06* (2006.01)
*B29K 77/00* (2006.01)
*B29K 509/08* (2006.01)

(56) References Cited

U.S. PATENT DOCUMENTS

| | | | |
|---|---|---|---|
| 5,146,712 A | 9/1992 | Hlavaty | |
| 5,228,740 A * | 7/1993 | Saltzman | B60J 1/1853 |
| | | | 296/146.1 |
| 5,522,191 A * | 6/1996 | Wenner | B60J 1/16 |
| | | | 296/146.1 |
| 5,531,046 A | 7/1996 | Kollar et al. | |
| 5,551,197 A | 9/1996 | Repp et al. | |
| 5,572,376 A | 11/1996 | Pace | |
| 5,799,444 A | 9/1998 | Freimark et al. | |
| 5,853,895 A | 12/1998 | Lewno | |
| 5,996,284 A | 12/1999 | Freimark et al. | |
| 6,026,611 A | 2/2000 | Ralston et al. | |
| 6,119,401 A | 9/2000 | Lin et al. | |
| 6,691,464 B2 | 2/2004 | Nestell et al. | |
| 6,902,224 B2 * | 6/2005 | Weinert | B60J 1/1853 |
| | | | 296/146.16 |
| 6,955,009 B2 | 10/2005 | Rasmussen | |
| 7,003,916 B2 | 2/2006 | Nestell et al. | |
| 7,073,293 B2 | 7/2006 | Galer | |
| 8,250,812 B2 * | 8/2012 | Hebert | B60J 1/1853 |
| | | | 49/413 |
| 8,316,583 B2 * | 11/2012 | Lahnala | E05D 15/0686 |
| | | | 49/408 |
| 8,402,695 B2 | 3/2013 | Smith et al. | |
| 8,495,841 B2 * | 7/2013 | DeGroff | E05D 15/165 |
| | | | 52/207 |
| 8,881,458 B2 | 11/2014 | Snider et al. | |
| 8,915,018 B2 | 12/2014 | Snider | |
| 9,878,599 B2 * | 1/2018 | Lahnala | E06B 7/14 |
| 10,023,026 B2 | 7/2018 | Snider et al. | |
| 2003/0213179 A1 * | 11/2003 | Galer | B60J 1/1853 |
| | | | 49/413 |
| 2004/0020131 A1 * | 2/2004 | Galer | B60J 1/1861 |
| | | | 49/413 |
| 2004/0098919 A1 * | 5/2004 | Bourque | B60J 10/74 |
| | | | 49/413 |
| 2004/0144034 A1 * | 7/2004 | Bourque | B60J 1/1853 |
| | | | 49/413 |
| 2006/0107600 A1 | 5/2006 | Nestell et al. | |
| 2008/0122262 A1 * | 5/2008 | Cicala | B60J 10/74 |
| | | | 296/201 |
| 2008/0127563 A1 | 6/2008 | Tooker | |
| 2009/0019778 A1 * | 1/2009 | Lahnala | B60J 1/1853 |
| | | | 49/413 |
| 2010/0122494 A1 * | 5/2010 | Lahnala | E05F 11/535 |
| | | | 49/358 |
| 2010/0122497 A1 * | 5/2010 | Lahnala | E05D 15/06 |
| | | | 49/413 |
| 2012/0091114 A1 * | 4/2012 | Ackerman | H05B 3/84 |
| | | | 219/203 |
| 2012/0110915 A1 * | 5/2012 | Lahnala | B60J 10/76 |
| | | | 49/413 |
| 2013/0255156 A1 * | 10/2013 | Snider | B60J 1/1853 |
| | | | 49/130 |
| 2014/0047772 A1 | 2/2014 | Hulst | |
| 2015/0314672 A1 * | 11/2015 | Lahnala | E05D 15/0691 |
| | | | 49/413 |
| 2020/0079186 A1 | 3/2020 | Snider et al. | |
| 2020/0079187 A1 | 3/2020 | Tooker et al. | |

* cited by examiner

VEHICLE REAR SLIDER WINDOW ASSEMBLY WITH UPPER RAIL CO-EXTRUDED FILLER

CROSS REFERENCE TO RELATED APPLICATION

The present application claims the filing benefits of U.S. provisional application Ser. No. 62/729,706, filed Sep. 11, 2018, which is hereby incorporated herein by reference in its entirety.

FIELD OF THE INVENTION

The present invention relates to a slider window assembly for a vehicle and, more particularly, a rear slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails that may be adhesively bonded at the surface of the fixed window panels. The slidable window panel may be moved along the rails to open and close the window. The slidable window panel may be driven or moved by a cable drive system.

SUMMARY OF THE INVENTION

The present invention provides a rear slider window assembly that has upper and lower rails or channels adhesively bonded at the inner surface of the fixed window panel or panels. The upper rail includes a filler and seal that is disposed in and along the U-shaped channel of the upper rail and that slidably receives the movable window panel therein. The seal comprises an extruded plastic or rubber seal with a sealing lip and/or a cushioning or dampening lip co-extruded with the seal body. The co-extruded lip or lips may comprise a softer material (such as a thermoset elastomer or rubber material, such as an Ethylene-Propylene-Diene-Monomer (EPDM) or a thermoplastic elastomer (TPE) or the like) to provide the desired dampening feature.

These and other objects, advantages, purposes and features of the present invention will become apparent upon review of the following specification in conjunction with the drawings.

DESCRIPTION OF THE PREFERRED EMBODIMENTS

Figure 1:
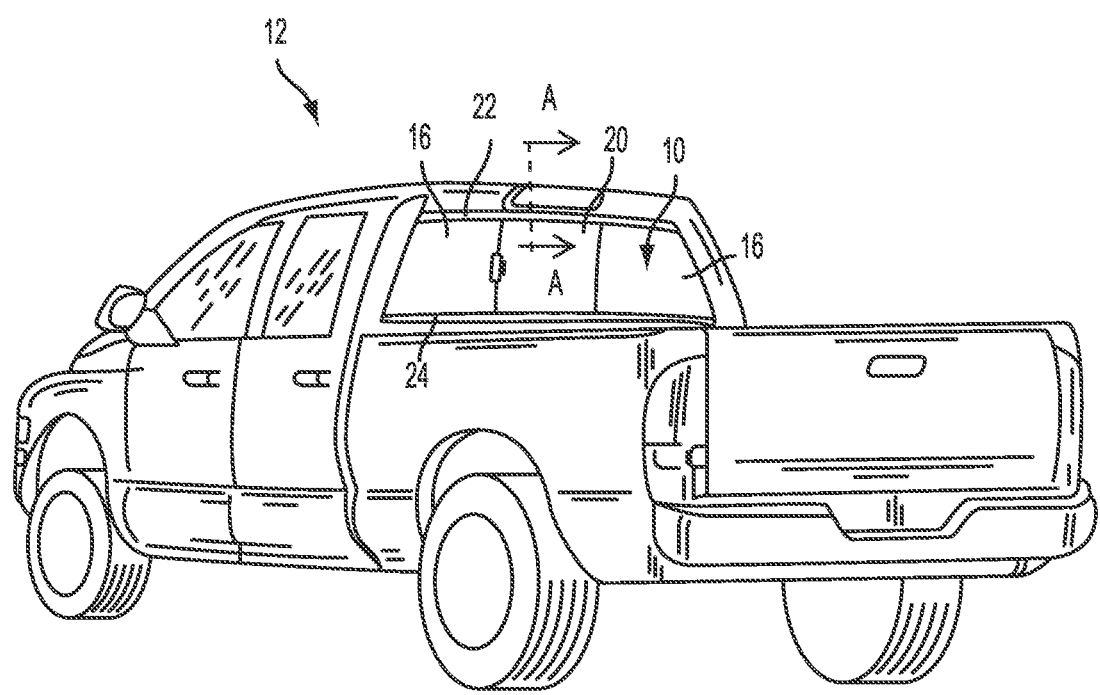
FIG. 1 is a rear perspective view of a pickup truck having a rear slider window assembly in accordance with the present invention.

Referring now to the drawings and the illustrative embodiments depicted therein, a rear slider window assembly 10 of a vehicle 12 (such as a pickup truck or the like) includes a fixed window panel 16 (or a pair of fixed window panels) having an opening established therethrough, and a movable window panel 20 that is movable relative to a frame or rails 22, 24 and fixed window panel 16 between an opened position and a closed position (FIG. 1). The rails include an upper rail 22 and a lower rail 24, with the upper and lower edge regions of the movable window panel 20 (FIG. 1) movably or slidably received in and along the respective upper and lower rails 22, 24. The upper rail 22 includes a filler and seal 26 that is disposed in and along the U-shaped channel of the upper rail 24 and that slidably receives the movable window panel 20 therein, as discussed below.

In the illustrated embodiment, the window assembly comprises a hole-in-glass window configuration, where a single fixed glass panel 16 has an aperture or hole or opening established therethrough to define separate spaced apart fixed window panels or panel portions. Optionally, the window assembly may comprise two fixed window panels or panel portions that are spaced apart so as to define an opening therebetween (and with upper and lower appliqués or trim or filler panels or elements disposed at the upper and lower regions of the opening and between the fixed window panels).

Upper and lower rails 22, 24 may comprise any suitable channel or rail element configured to slidably receive an upper or lower edge portion of the movable window panel. Slider or movable window panel 20 is movable along lower rail 24 and upper rail 22 of frame portion 14 to open and close the aperture or opening, such as in a manner similar to known slider window assemblies. The movable window panel 20 may include or may be disposed at a lower carrier, which may receive the lower perimeter edge region of the slider window panel 20 therein and is slidably or movably received in the channel portion of the lower rail 24 of frame portion 14, while an upper region of the movable panel is slidably received in the seal 26 at the upper rail 22.

The upper rail 22 has an inverted generally U-shaped channel 22a that receives the filler 26 that slidably receives an upper edge region of the movable window panel 20 therein. A wiping seal may be disposed in or received in another channel 22b of the upper rail 22 for sliding or wiping engagement with the movable window panel 20 as the movable window panel moves along the channel portion between its opened and closed positions. The upper rail includes an attaching surface for attaching (such as via adhering or bonding) to the fixed window panel(s) and optionally for attaching the channel portion to the vehicle frame or sheet metal when the window assembly 10 is installed in the vehicle.

The filler or seal 26 comprises an extruded elongated plastic or rubber sealing element that provides a U-shaped receiving channel and that is configured to be disposed in the U-shaped channel 22a of the upper rail 22. The filler 26 comprises a body portion 26a that defines the U-shaped receiving channel, with a tab 26b that engages an edge of the upper rail 22 to position the filler in the upper rail.

Figure 2:
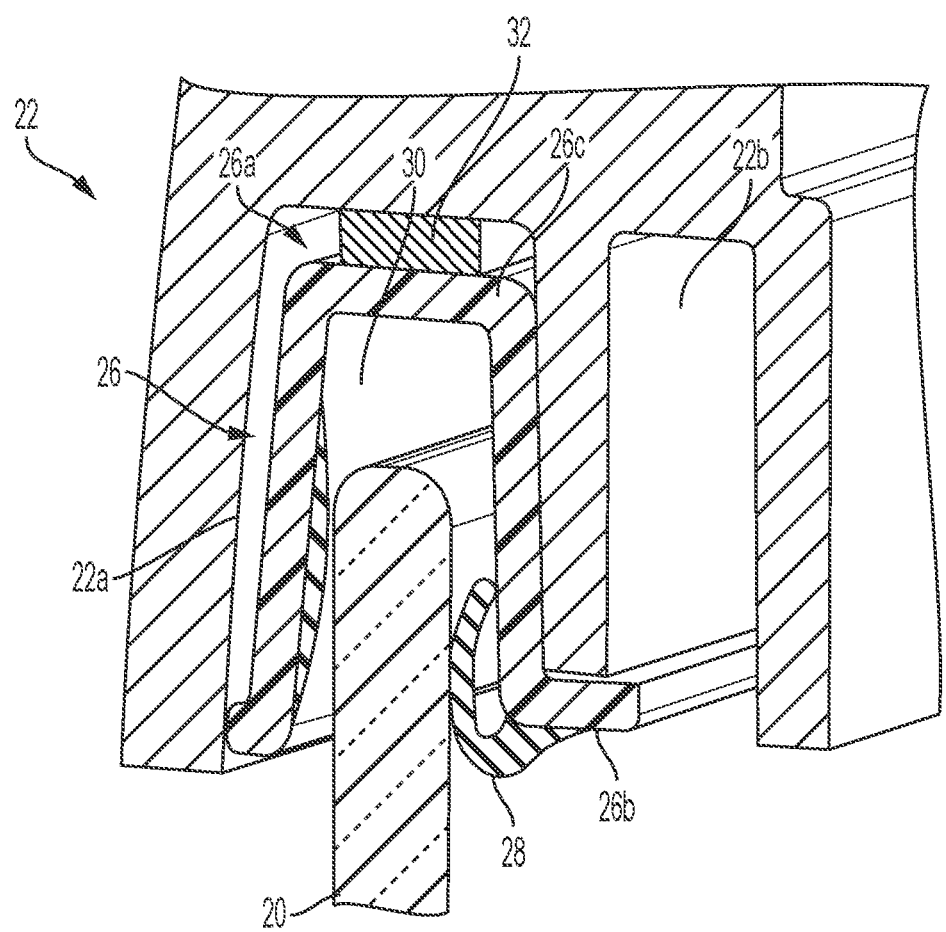
FIG. 2 is a perspective and sectional view of the upper rail taken along the line A-A of FIG. 1, showing the co-extruded seal engaging the movable window panel.
Figure 3:
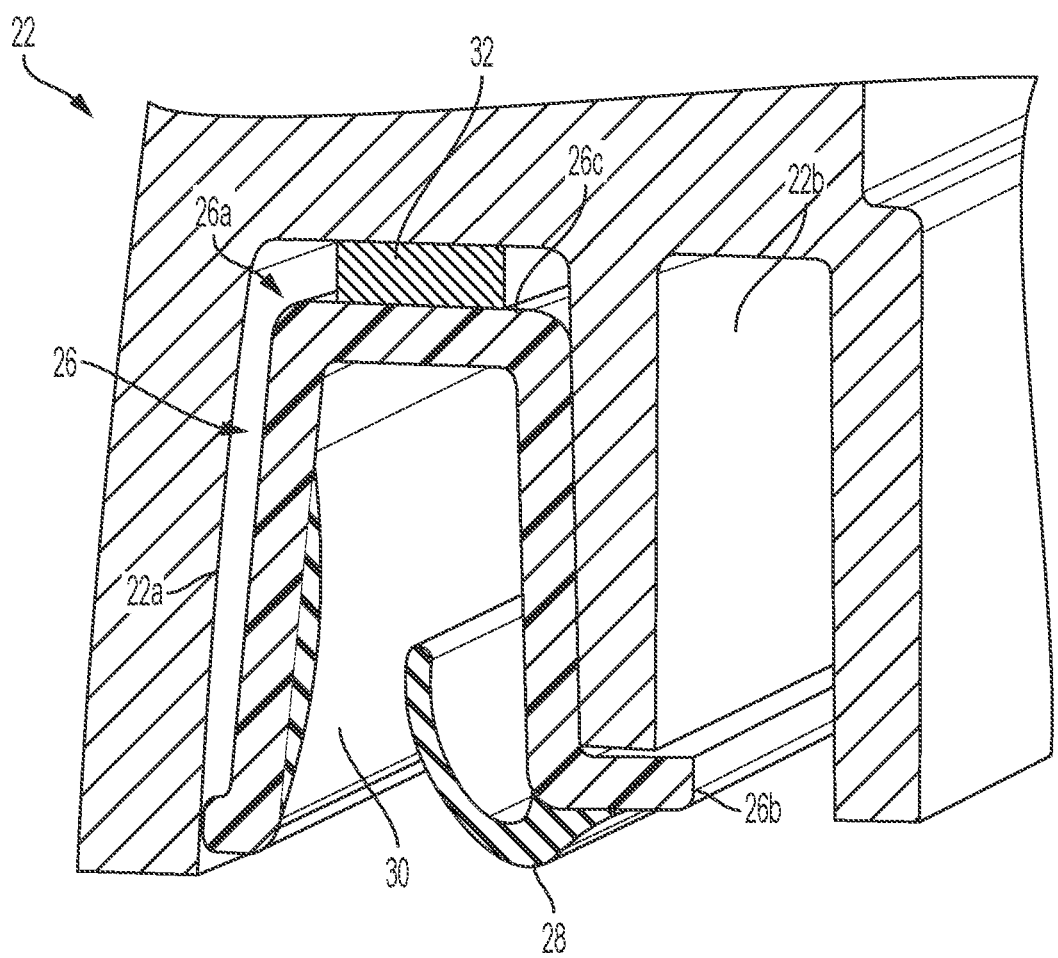
FIG. 3 is another perspective and sectional view of the upper rail taken along the line A-A of FIG. 1, showing the co-extruded seal without the movable window panel engaged therewith.
Figure 4:
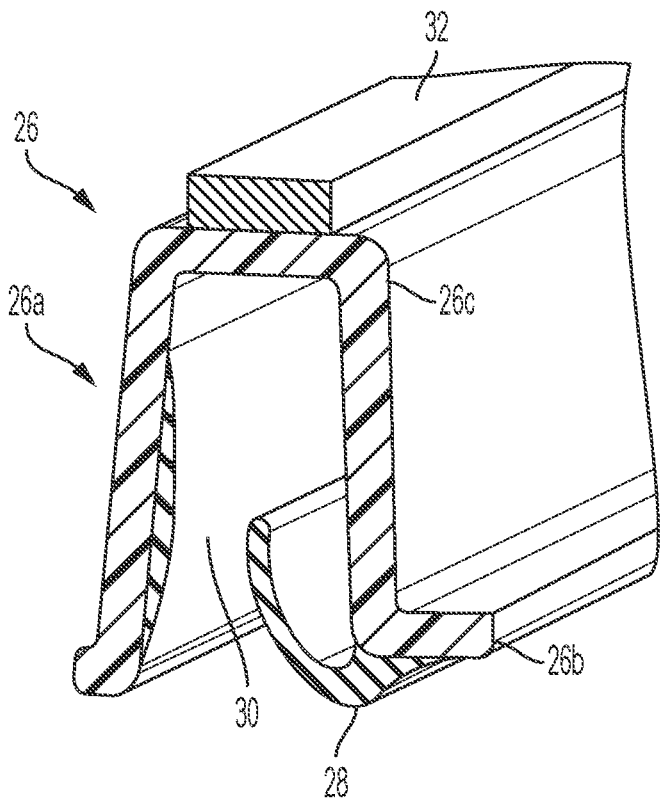
FIG. 4 is another perspective and sectional view of the co-extruded seal taken along the line A-A of FIG. 1.
Figure 5:
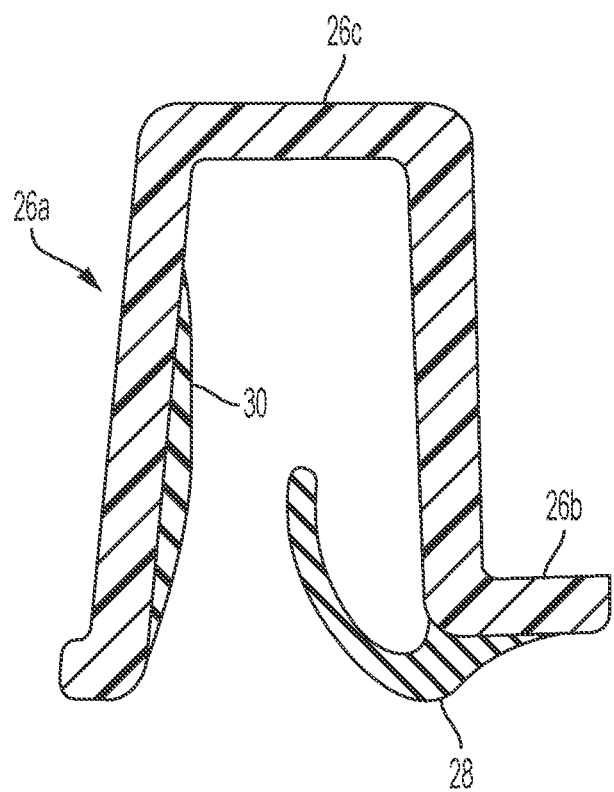
FIG. 5 is an end view of the co-extruded seal.

The filler 26 includes a first lip 28 established at the tab 26b, and includes a second lip or raised portion 30 at the wall of the body portion 26a opposite the wall at which the tab 26b and lip 28 are established. As shown in FIGS. 2-4, the filler 26 has a strip of tape 32 (or other suitable attaching element, such as adhesive or the like) disposed at and along the upper wall 26c of the filler body for attaching the filler to the upper surface of the U-shaped channel 22a of the upper rail 22.

The flexible lip 28 and the cushioning or dampening element or lip 30 are co-extruded with the filler body 26a. The co-extruded lip or lips may comprise a softer material (such as a thermoset elastomer or rubber material, such as EPDM or TPE the like) as compared to the filler body 26a to provide the desired dampening feature. In the illustrated embodiment, the lip 28 comprises a flexible lip that flexes when the movable window panel is received in the channel 22a and filler body 26a, while the lip 30 comprises a thicker material established along the opposite side of the channel of the filler body. The softer material lips compress when the window panel is received in the filler and upper rail, and provides a dampening or cushioning function at the window panel and function to reduce vibration of the window panel.

During manufacture of the filler, the lips 28, 30 are co-extruded with the filler body 26a. For example, the filler body may be extruded of a less flexible polymeric material (such as an engineered plastic material, such as Acrylonitrile Butadiene Styrene (ABS) or glass-filled nylon or polyvinylchloride material or the like), while the lips 28, 30 may be formed with (via co-extrusion with) the filler body, but formed out of a more flexible, compressible material. For example, the body may comprise any suitable plastic or polymeric material, and the lips 28, 30 may comprise a rubber or EPDM material or the like. One of the lips (e.g., lip 28) may comprise a flexible lip that is coextruded along a lower part of the filler body and that is formed so that it bends upward into the channel and flexes when engaged by the movable window panel. The other of the lips (e.g., lip 30) may comprise a thicker compressible wall material established or coextruded along the opposite wall of the channel of the filler body so as to narrow the width of the filler body channel, whereby the lip 30 compresses when the movable window panel is received in the channel.

The filler body (comprising a less flexible or non-compressible harder material), with the softer lips or elements extruded therealong, is inserted into the channel of the upper rail 22 and taped or adhesively attached therein via the tape or adhesive element 32. The less flexible or harder filler body provides the desired or appropriate shape for receiving the upper region of the movable window panel 20 therein, while the softer or compressible/flexible lips or elements engage the upper region of the window panel (see FIG. 2) to allow for movement of the window panel along the filler and channel of the rail while limiting movement in a direction transverse to the longitudinal axis of the filler and channel. The filler comprises a unitary element (formed during a multi-shot extrusion process or a co-extrusion process) that provides both the structural form feature and the flexible/compressible lips feature.

Therefore, the present invention provides enhanced cushioning and dampening of the movable window panel within the filler body channel. The softer compressible material of the lips 28, 30 provide the desired dampening feature, and is suitable for co-extruding the lips onto the filler body during the extrusion of the filler body. The extrusion of each lip may be done during a respective extrusion after forming the filler body or via a two shot extrusion or co-extrusion or tri-extrusion process to add the lips 28, 30 to the harder plastic filler body. Optionally, the filler body and the lips may be formed via a two-shot or co-extrusion process or a three-shot or tri-extrusion process.

The upper and lower rails may comprise any suitable channel element configured to slidably receive the movable window panel and may be formed via any suitable forming means. For example, the channel portions and rails may be formed via an injection molding process. The rails may comprise any suitable material or materials, such as, for example, a rigid or substantially rigid molded polymeric material (such as a polyvinylchloride material or polycarbonate or PC-ABS or the like), and preferably a rigid polymeric material or engineered plastic material. The rails may be adhered or bonded to the respective window panels and/or sheet metal via any suitable adhesive, such as, for example, by utilizing aspects of the window assemblies described in U.S. Pat. Nos. 10,023,026; 5,551,197 and/or 5,853,895, which are hereby incorporated herein by reference in their entireties.

The movable window panel may be movable between its opened and closed positions via any suitable means, such as via manual pushing or pulling at the window panel and/or in response to actuation of a drive motor of a drive motor assembly or system, which may move cables or wires of cable assemblies relative to a sheath of the cable assemblies or the like to impart horizontal movement of the slider window panel 20 along the rails 22, 24. Optionally, the drive motor assembly may utilize aspects of the drive assemblies of the types described in U.S. Pat. Nos. 4,920,698; 4,995,195; 5,146,712; 5,531,046; 5,572,376; 6,955,009 and/or 7,073,293, and/or U.S. Publication Nos. US-2004-0020131 and/or US-2008-0127563, which are all hereby incorporated herein by reference in their entireties.

The benefits of embodiments of the slider window assembly of the present invention may also be realized in vehicular movable window assemblies other than a rear slider window assembly for a pickup truck or the like, such as (for example) a slider window assembly suitable for use as a movable side window for a vehicle such as a van or a bus. The window assembly may utilize aspects of the elements and window assemblies described in U.S. Pat. Nos. 8,915,018 and/or 8,881,458, which are hereby incorporated herein by reference in their entireties.

Optionally, the fixed window panel and movable window panel of the window assembly of the present invention may include one or more electrically conductive elements, such as heater grids or the like, which may be powered utilizing aspects of the window assemblies described in U.S. Pat. Nos. 8,402,695 and/or 8,881,458, which are hereby incorporated herein by reference in their entireties. The window assembly may include a heater grid on each of the fixed window panels and on the movable window panels, with a heating system that provides power to the heater grid on the movable window panel irrespective of the position of the movable window panel relative to the fixed window panel and throughout the range of movement of the movable window panel between its opened and closed positions, such as by utilizing aspects of the window assemblies described in U.S. Pat. Nos. 8,402,695 and/or 8,881,458, incorporated above.

Optionally, the window assembly or assemblies of the present invention may utilize aspects of the window assemblies described in U.S. Pat. Nos. 8,915,018; 8,881,458; 8,402,695; 7,073,293; 7,003,916; 6,119,401; 6,026,611; 5,996,284; 5,799,444 and/or 6,691,464, and/or U.S. Publication Nos. US-2014-0047772; US-2006-0107600;

US-2008-0127563; US-2004-0020131 and/or US-2003-0213179, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A slider window assembly for a vehicle, said slider window assembly comprising:
   at least one fixed window panel, said at least one fixed window panel defining an opening;
   an upper rail and a lower rail attached at said at least one fixed window panel;
   wherein said upper rail comprises a channel;
   a filler disposed in the channel of said upper rail;
   wherein said filler comprises a filler body having opposite first and second side walls along a filler channel, and wherein said filler comprises first and second lips established along the respective first and second side walls of said filler body;
   wherein said first and second lips are extruded onto and along said filler body;
   wherein said first lip is affixed along said first side wall of said filler body and said second lip is affixed along said second side wall of said filler body, and wherein said first and second lips are separate and distinct from one another and spaced apart from one another;
   a movable window panel that is movable along said upper rail and said lower rail, with an upper region of said movable window panel received in the filler channel of said filler in the channel of said upper rail;
   wherein said movable window panel is movable between a closed position, where said movable window panel is disposed at said opening, and an opened position, where said movable window panel is disposed at least partially along said at least one fixed window panel;
   wherein each of said first and second lips of said filler comprises a compressible and flexible material and provides a dampening and cushioning function at said movable window panel when the upper region of said movable window panel is received in the filler channel of said filler in the channel of said upper rail; and
   wherein said filler body comprises a material different than the compressible and flexible material of said first and second lips of said filler.

2. The slider window assembly of claim 1, wherein said filler body comprises a plastic material.

3. The slider window assembly of claim 2, wherein said first and second lips comprise a pliable rubber material.

4. The slider window assembly of claim 3, wherein said first and second lips comprise EPDM or TPE material.

5. The slider window assembly of claim 1, wherein said first lip comprises a flexible lip that extends from said first side wall of said filler body.

6. The slider window assembly of claim 5, wherein said second lip comprises a compressible layer of material at and along said second side wall of said filler body.

7. The slider window assembly of claim 6, wherein said first and second lips are disposed at the respective first and second side walls so as to protrude into the filler channel and into contact with opposite sides of said movable window panel.

8. The slider window assembly of claim 1, wherein said first and second lips are co-extruded onto and along said filler body.

9. The slider window assembly of claim 1, wherein said filler body and said first and second lips are formed via a two-shot extrusion process.

10. The slider window assembly of claim 1, wherein said filler body and said first and second lips are formed via a three-shot extrusion process.

11. The slider window assembly of claim 1, wherein said at least one fixed window panel comprises a single fixed window panel having an opening therethrough.

12. The slider window assembly of claim 1, wherein said at least one fixed window panel comprises first and second fixed window panels defining an opening therebetween.

* * * * *